United States Patent
Hunt et al.

(10) Patent No.: US 7,555,124 B2
(45) Date of Patent: Jun. 30, 2009

(54) SECURE VIDEO SYSTEM FOR DISPLAY ADAPTOR

(75) Inventors: C. Bradley Hunt, Westlake Village, CA (US); John Christopher Park Russell, San Diego, CA (US)

(73) Assignee: Motion Picture Association of America, Sherman Oaks, CA (US)

( * ) Notice: Subject to any disclaimer, the term of this patent is extended or adjusted under 35 U.S.C. 154(b) by 638 days.

(21) Appl. No.: 11/005,757

(22) Filed: Dec. 6, 2004

(65) Prior Publication Data

US 2005/0123135 A1      Jun. 9, 2005

Related U.S. Application Data

(60) Provisional application No. 60/527,379, filed on Dec. 5, 2003.

(51) Int. Cl.
*H04N 7/167* (2006.01)
*H04L 9/00* (2006.01)

(52) U.S. Cl. ........................ 380/202; 713/176
(58) Field of Classification Search .................. 380/202
See application file for complete search history.

(56) References Cited

U.S. PATENT DOCUMENTS

| | | | |
|---|---|---|---|
| 6,523,113 B1 * | 2/2003 | Wehrenberg | 713/176 |
| 6,885,748 B1 * | 4/2005 | Wang | 380/201 |
| 6,983,050 B1 | 1/2006 | Yacobi et al. | |
| 6,996,236 B1 | 2/2006 | England et al. | |
| 2002/0078380 A1 * | 6/2002 | Lin et al. | 713/201 |
| 2002/0159596 A1 * | 10/2002 | Durand et al. | 380/255 |

OTHER PUBLICATIONS

International Search Report and Written Opinion, PCT/US2004/040863.
English Translation of First Office Action (China); Application No. 200480040081.2, dated Oct. 24, 2008.

* cited by examiner

*Primary Examiner*—Brandon S Hoffman
(74) *Attorney, Agent, or Firm*—Connolly Bove Lodge & Hutz LLP; Jonathan A. Jaech

(57) ABSTRACT

A secure video system for a graphics display adaptor includes a module for decrypting a content signal from a media player or other secure content source. The adaptor may be provided as a component of a computer graphics system, or in a stand-alone special-purpose device. The adaptor may include other features for preventing unauthorized use of protected content, for example authenticating the source of a content signal before providing an output audio or video signal, encrypting the output video signal, responding to commands to renew or revoke cryptographic keysets, and embedding forensic tracking information in an audio or video signal.

21 Claims, 5 Drawing Sheets

SECURE VIDEO SYSTEM FOR DISPLAY ADAPTOR

CROSS-REFERENCE TO RELATED APPLICATION

This application claims priority pursuant to 35 U.S.C. § 119(e) to U.S. Provisional Patent Application Ser. No. 60/527,379, filed Dec. 5, 2003, which application is specifically incorporated herein, in its entirety, by reference.

BACKGROUND OF THE INVENTION

1. Field of the Invention

The present invention relates to display adaptors, tuners, set-top boxes, media players, or like devices for providing an analog or digital video signal to a CRT monitor, flat-panel display, television, digital television, or like visual display unit, and more particularly to a method for providing the secure playback of the video signal from such devices.

2. Description of Related Art

Various video display devices are known in the art, and include, for example, televisions such as use a NTSC, PAL, SECAM, or High Definition television signal as input; computer monitors configured to accept analog signals such as RGB composite, YPbPr component, or S-video, and digital monitors and televisions configured for using DVI, HDMI, or other digital signal input. Digital monitors and televisions often include an adaptor for accepting various analog audio-video (A/V) signals, as well. The display screen itself may comprise a cathode ray tube, liquid-crystal flat panel, gas plasma panel, or similar device. The display devices also typically comprise electronics for driving a display screen using one or more types of video input signals, and for providing audio output.

Such display devices are nearly always provided as integrated assemblies with one or more input jacks. The consumer connects the available signals source, such as a tuner, set-top box for cable or satellite signal, DVD media disc player, analog or digital tape player, game player, or video output of a general-purpose computer, to the appropriate jack. The display device's internal electronics use an input video signal and produce the appropriate internal signals for driving the device's display unit. Tuners are usually integrated into television cabinets, and less commonly, signal sources such as tape or media disc players are also integrated into display devices. Thus, most display devices can accept a variety of different audio-video signals from external devices.

With the advent of digital content standards (e.g., CD and DVD) and digital broadband distribution systems, audio-visual content of all types is increasingly delivered in digital form. Such digital content is processed by an A/V rendering system to provide an analog or digital A/V signal for a display device. Such rendering systems are currently provided in or associated with numerous types of ubiquitous devices, for example, DVD/CD players, digital set-top boxes for both cable and wireless signals, digital tape players, and personal computers. Indeed, wherever content is delivered in digital form, some type of A/V rendering system is always present as a necessary element for driving an A/V output device. And according to the prior art, the function of the A/V rendering system is limited to such rendering.

It is widely recognized that digital content is susceptible to unauthorized copying and distribution. Whereas repeated copying of analog content usually results in significant loss of quality, digital content can be copied repeatedly with little or no degradation in quality. Also, the availability of public broadband distribution systems and analog-to-digital devices has greatly increased opportunities to acquire, copy, and redistribute digital content, whether or not such copying and redistribution is authorized. Various copyright protection schemes are available to prevent unauthorized copying and distribution, but such methods generally utilize control of encryption/decryption upstream of A/V rendering systems. For example, content may be encrypted or contain other copy-protection controls as provided on disc or tape media, in a cable signal, satellite signal, or digital broadcast signal. Such content may be received by an authorized media player, set-top box, satellite receiver or the like, which then generates an audio-video signal.

However, there is no practical way to prevent unauthorized copying of content after it is provided to an output device. Even if the output device is itself secure (which is often not the case anyway), audio, video, or audio-video content may readily be captured at the time of play by a recording device, and provided in unencrypted digital form. For example, a digital camcorder may be used to record a movie when it is played in a theater or at home, and the output from the camcorder may be freely copied and distributed in digital form. For further example, various analog-to-digital devices are commonly available, such as audio-video capture devices, for providing digital content from an analog input A/V signal. It is relatively easy to capture an analog video signal output from a DVD player, CD player, digital set-top box, personal computer, or similar device, and to convert it into an unprotected digital form. Although it is sometimes possible to mark content as such using audio or video watermarking, prior art methods of copyright protection do not adequately prevent unauthorized use of such copies.

At the same time, public broadband distribution systems, for example, the Internet, provide tremendous utility by delivering all forms of digital content without discriminating between content types. For example, the same system may be used to readily deliver both encrypted and unencrypted content, both copy-protected content and freely-to-copy content, all in a great variety of different formats. It is desirable, therefore, to provide a method and system that preserves this utility for content consumers, without substantially impairing the ability of content providers to implement effective digital rights management and receive fair compensation for valuable creative works and other content.

SUMMARY OF THE INVENTION

The present invention provides a method and system for preventing unauthorized copying or use of content provided as digital input for, or video output from, a video card or graphics adaptor. A system or method according to the invention may be implemented in association with A/V rendering systems for digital content. Because some type of A/V rendering system is always required for listening, viewing, or otherwise sensing content delivered in digital form, the invention should be useful to prevent unauthorized use of any digital content that derives value from being listened to, viewed, or otherwise sensed in analog form. Advantageously, the invention may be used to prevent unauthorized use of protected, copyrighted content that has been recaptured in its analog form and converted to digital form using the analog output of the A/V rendering system. A further benefit of the invention is that it may be implemented to prevent unauthorized use of copyrighted content from any digital source, including from public broadband distribution systems, without interfering with use of personal, non-copyrighted content rendered by the same device.

For example, the invention may be implemented on general-purpose computer systems with integrated or modular graphics systems in combination with software or in firmware that executes on general-purpose computers, consumer electronics devices, professional gear, or other audio/video equipment designed for consumer or professional audiovisual content player and recording. The combination of software and hardware for playing DVD discs using a home computer may fall into this category, as may professional editing systems. The invention may also be implemented in special-purpose or stand-alone consumer or professional electronics devices that are configured to render a copy-protected content signal and output a video signal (with or without an accompanying signal for audio content), such as DVD/CD players, digital set-top boxes, and mobile communication devices.

In addition, the invention may be implemented using components of the foregoing examples, such as video cards or graphics adapters for receiving a content signal and providing a video signal output. Such cards or adaptors may be configured for connection to a general-purpose or special purpose system as generally described above. All or portions of the methods described herein may be performed using firmware or software implemented in memory for a general-purpose computer, application-specific integrated circuits (ASIC's), field-programmable gate arrays (FPGA's), other electronic and chip devices, or various combinations of the foregoing elements.

Consistent with the foregoing, according to an embodiment of the invention, a secure video system comprises components as described herein. A player/receiver component controls the playing of specially coded content, sometimes referred to herein as secure video content (SVC) data, according to rules established by a content provider. As known in the art, such content is provided to the player/receiver in digital encrypted form. The player/receiver decrypts the data, and uses it to generate an input signal suitable for a display device, and audio output device, or audio-visual output device. In addition, the player/receiver also receives and plays unencrypted, non-SVC data in a conventional fashion.

That is, the player/receiver discriminates between SVC and non-SVC data. The player/receiver analyzes all content it receives to identify SVC data. Non-SVC data is provided as audio-video output for a display device as known in the art, while SVC data is decrypted if provided in encrypted form and then provided as audio-video output according to the rules established by a content provider. The player/receiver includes a decryption/authorization component, preferably implemented in firmware on a hardware component of the system, referred to herein as secure video graphics (SVG) hardware, that analyzes the content for an SVC identifier, authenticates SVC data received from the player/receiver, and decrypts it if authorized. SVG hardware may be placed in any convenient location, for example, on a video card or graphics adaptor for a system according to the invention, on a system motherboard, or implemented in trusted software such as a protected driver or hardware attested software. A third component of the system may comprise trust authentication (TA) software and/or hardware, that may operate to authenticate a chain-of-trust for content delivered to the SVG hardware, or to perform security maintenance, device revocation, and activation features.

SVG hardware enhances copy protection in a graphics system by adding certain security components. These security components may include, for example, (a) a cryptographic unit to decrypt SVC data within hardware; (b) a watermark detector to detect and extract rights-related data that has been embedded into the SVC data, such as a watermark identifying content as SVC, or a watermark revoking a cryptographic keyset; or (c) secure digital video outputs to restrict display to approved protected digital outputs using link encryption technology, such as 5C Digital Transmission Content Protection (DTCP) or High-bandwidth Digital Content Protection (HDCP).

According to an embodiment of the invention, authorized SVC data is delivered or stored in encrypted form at all times. For example, authorized SVC data may be provided to the A/V rendering system using an encryption-based conditional access system, a digital rights management system, or on encrypted, pre-recorded media. In any event, secure video content data may not be decrypted except in the SVG hardware prior to video output.

Secure video content may be identified as such by some form of SVC watermark, or in the alternative, all encrypted content may be presumed to be SVC. The SVC watermark would be configured to survive commonly-available methods of capturing and redigitizing analog audio and video output, as known in the art. For example, audio watermarks are generally preserved when digital content is converted to analog form and then redigitized. A video watermark may also be configured to survive digital/analog/digital recapture. If the SVG hardware encounters unencrypted content that does not contain an SVC watermark or other methods of identifying it as SVC content, then the unencrypted content may be regarded as non-SVC, and processed to provide normal audio-video output.

The SVG hardware may also be configured to prevent normal handling of SVC data if (1) the data was delivered unencrypted or (2) the source for the digital content is not trusted. For example, the SVG hardware and a media player module may be configured to securely communicate with a trust authority module to verify that SVC data received by the SVG hardware originated from a trusted source. If the source of the SVC data cannot be authenticated, the SVG hardware may be configured to not provide a normal output signal. For example, if the SVG hardware comprises a video adaptor, the video signal may be disrupted entirely or impaired to any desired degree, such as by disrupting a specific user interface window or area of a display screen. If the source cannot be authenticated, the SVC data may be discarded without being decrypted, at least in part. Personal, non-copyrighted content (i.e., non-SVC) should be played without authentication.

The trust authority module and the SVG hardware may be configured so as to be securely renewed if their security is compromised. New trust authority software and encryption keys may be provided to the system hardware using a method as described herein. It should be possible to determine whether a renewal attempt is successfully completed. If either module cannot be securely renewed, operability of the SVG system may be revoked. In addition, or in the alternative, new keysets may be provided via renewal messages without voiding operability of prior keysets. Thus, the system may be immunized against attacks on its software components.

Revocation may be initiated by a revocation command securely received by an upstream controller and successfully authenticated. Once authenticated, a revocation command may cause voiding of the current cryptographic keyset or trust authority software, and prevent future decryption of SVC data, until the SVG device is renewed. If only a portion of the SVG hardware is compromised, a revocation message may be provided so as to only affect the compromised portion.

In addition, or in the alternative, revocation may be initiated by revocation watermarks embedded in any SVC data to be processed by SVG hardware. The SVG hardware may be configured to detect and decode such watermarks. Watermarks may be placed into content, for example, still graphic images or video sequences. Revocation messages for watermarks may be authenticated before revoking system cryptographic status. In the alternative, or in addition, authentication of some or all watermarks may be waived. For example, revocation watermarks for trust authorities may be configured so as to not require authentication, to prevent a corrupt trust authority from preventing its own revocation. To prevent hacking of the system through watermarks, watermarks that do not require authentication may be secured using other methods, such as using tamper-resistant cryptographic keys embedded in the SVG hardware.

In general, SVG hardware should be constructed to be hardware tamper resistant, to protect the cryptographic and revocation keysets from being compromised. For example, printed circuit board (PCB) components and traces may be coated with an epoxy or similar substance to make physical tampering more difficult. In the alternative, or in addition, current cryptographic keys may be stored in volatile memory so as to be lost if power is disrupted. In such case, the keyset may be reloaded by a renewal message from a trust authority, provided that an identifier for the SVG hardware and last keyset revision is retained in a non-volatile memory.

Other features of a SVG system may include placing a watermark in the audio or video rendered output of SVC data. For example, such a watermark may provide a forensic tracking function, such as by comprising a unique identifier for the content and SVG hardware. If output from the secure video system is illegally copied, the original source of the copied signal may be determined from the forensic tracking watermark. A watermark embedded in the audio or video output from the SVG hardware could also serve to identify the output as being derived from SVC data for the purposes described above.

A more complete understanding of the secure video graphics system for a display adaptor will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention provides a system for preventing unauthorized copying and use of copyrighted content provided as digital input for, or video output from, a video card or graphics adaptor. The invention further provides support for secure distribution and rendering of high value, copyrighted content in the form of SVC data as well as the rendering of unprotected non-SVC data. Using a combination of content encryption, robust watermarking, secure hardware and chain of trust authentication, the method may be used to discriminate between SVC and non-SVC data, and to prevent use of unauthorized SVC data without hindering use of other personal, non-copyrighted content or authorized uses of SVC data. Hence, unauthorized copying and distribution of SVC data may be discouraged in a targeted fashion. In the detailed description that follows, like element numerals are used to describe like elements appearing in one or more of the figures.

Figure 1:
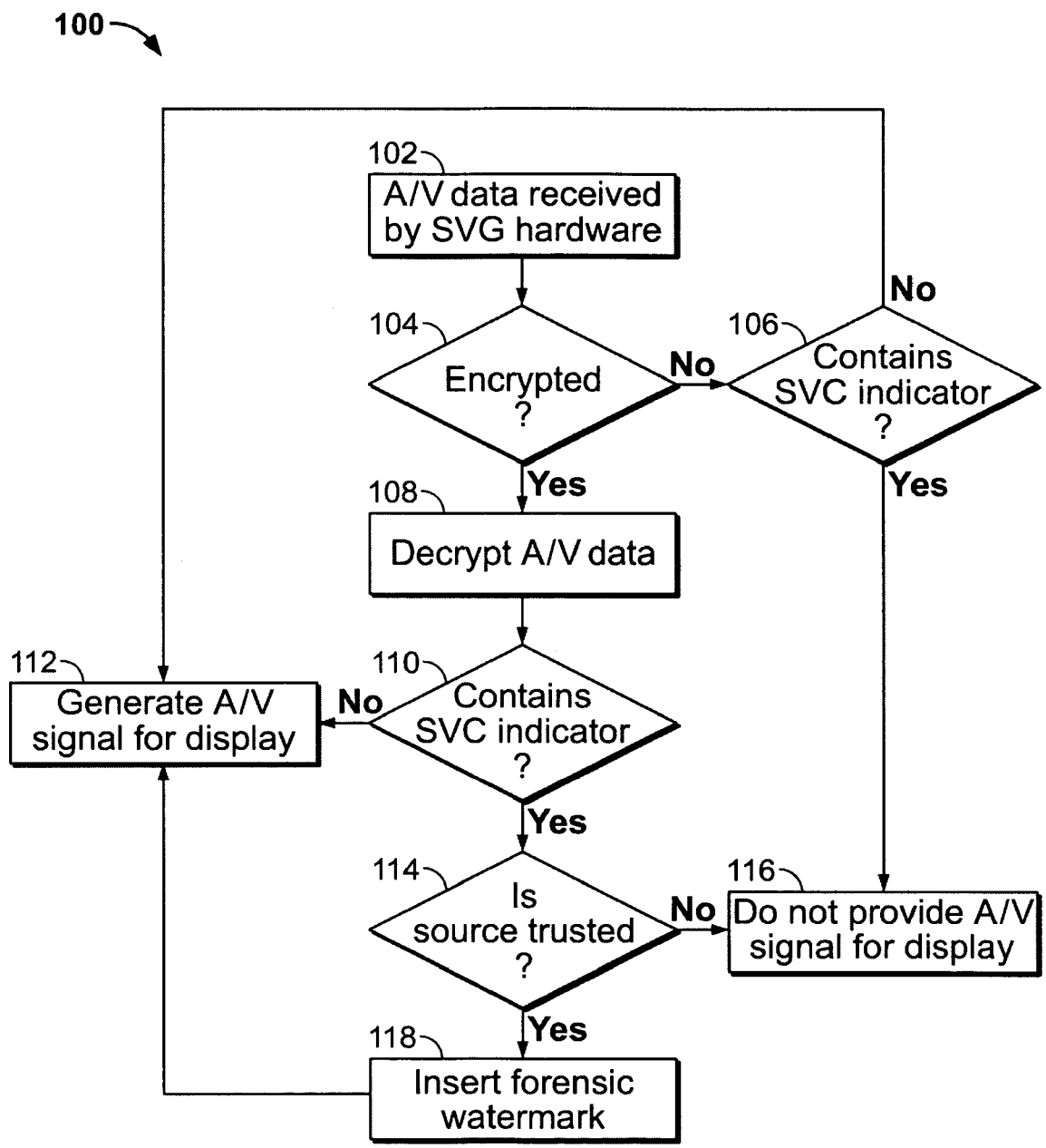
FIG. 1 is a flow chart illustrating exemplary steps for a method for rendering secure video content to a display device.

FIG. 1 shows a method 100 for preventing use of unauthorized SVC data without hindering use of other personal, non-copyrighted content or authorized uses of SVC data. At step 102, a player/receiver device receives A/V data and outputs it to an SVG hardware device associated with the player/receiver. The A/V data may be unrestricted as to type, and need not come from a secure source. Secure video content in the A/V data should be delivered and stored in encrypted form, and may possess a robust SVC watermark or other identifier, identifying it as SVC and permitting discrimination from other non-SVC data. The AV data may be supplied from any suitable source, for example, as pre-recorded encrypted content from a DVD or broadband connection, or a digital cable, satellite, or terrestrial broadcast signal. SVC data should be encrypted, but an illegal digital copy derived from a SVC analog output would probably be unencrypted but still contain a watermark or other robust identifier that identifies it as SVC data.

Generally, a suitable player/receiver device should generate an audio or video output for a display device while discriminating between SVC and non-SVC data. For example, a system such as a set-top box for receiving a cable or satellite signal may incorporate SVG hardware, and be connected to a TV that displays the video content. A DVD player connected to a TV, or a computer with a DVD player connected to a video monitor may also incorporate SVG hardware for generating output A/V signals. The player/receiver device also contains software and/or hardware that enforces the content usage rights and implements the content distributor's business rules SVC data. Output from the player-receiver for audio-visual devices should be compatible with standard audio and video signals as known in the art.

At step 104, the SVG hardware analyzes the A/V data to determine whether if it is delivered in encrypted form. At step 106, the SVG hardware analyzes the AV data if it is not encrypted, to determine whether it contains a SVC watermark or other indicator identifying it as SVC. If the A/V data is not in encrypted form and is not identified as SVC, the SVG hardware generates an output signal for display at step 112. In the alternative, the SVG may perform step 112 for all A/V data that is not received in encrypted form (i.e., step 106 may be omitted), but this should be considered a less robust implementation of the invention. To prevent use of unencrypted but watermarked SVC content, unencrypted data should also be tested for the presence of an SVC identifier before an output is provided.

At step 108, if the A/V data is encrypted, the SVG hardware decrypts the SVC data. At step 110, if the A/V data was in encrypted form and no SVC identifier has yet been detected it, the SVG hardware tests the decrypted content again to determine whether it contains a SVC watermark or other SVC identifier. If no SVC identifier is present, the SVG generates an AV signal at step 112.

Optionally, all encrypted data may be considered as being SVC, and step 110 may be omitted. However, it may be preferable to test encrypted data for the presence of a separate SVC identifier. This should permit use of the SVG hardware with data that is encrypted, but that is not SVC. In addition, it may be possible to detect some forms of SVC identifiers in encrypted data without decrypting at least a portion of the A/V data. Accordingly, in an embodiment of the invention, step 108 (decryption) may be delayed for at least a portion of the AV until after either of steps 110 or 114. In addition, or in the alternative, steps 108, 110 and 114 may be performed in a concurrent or alternating fashion.

At step 114, if the AV data is watermarked as SVC and has been received in encrypted form, the SVG hardware determines whether it has been provided from a trusted source. For example, the SVG hardware may initiate a series of cryptographic handshakes and key exchanges tracing back the path of the SVC, until it can verify that the SVC came from an approved and authenticated source. Such a source may comprise, for example, an approved media player playing content from authorized media, a digital rights management system or a trusted hardware component.

For example, the SVG hardware receives SVC encrypted with a secret key $$K=H(K1, K2),$$

wherein H is a cryptographic hash of K1 and K2, and with a unique process ID (PID) of the receiving device and an optional content ID (CID) number identifying the specific SVC. K1 may be chosen to be the same for all SVG hardware, whereas K2 may be known only by the player/receiver device, and may be different for each SVC. The SVG hardware may send this information along with a random cryptographic number N, known as a "nounce" or "number used once" in the format $$E_{TE'}(N,PID,CID),S_{SS''}(E_{TE'}(N,PID,CID))$$

securely through a graphics driver (GD) to a trusted authority (TA) software module co-located with the SVG hardware, using the signing key of the SVG hardware (SS") and the public key of the TA software (TE").

In general, the nomenclature herein should be understood as follows. Given a message "m," than "c=$E_K$(m)" represents the cyphertext of m produced by symmetric encryption with the secret key K, and "c=$D_K$(C)" represents the original message decrypted from the cyphertext using the same key K. Examples of symmetric encryption algorithms include AES, RC4, and 3DES. "$E_{K'}$(m)" represents the cyphertext of m produced by asymmetric encryption with public key K' and likewise, "$D_{K''}$(m)" represents the original message decrypted using K". Examples of asymmetric encryption algorithms include RSA and ECC. "H(m) represents a one-way cryptographic hash of the message "m." Examples of one-way cryptographic hash algorithms include SHA-1, SHA-128, and MD5. Also, "s=$S_{K''}$(m)" represents the digital signature of "m," using the private key K" and "v=$V_{K'}$(m)" represents the Boolean validation of "s" (i.e., "v" is either true or false) using the corresponding public key K'. Examples of digital signature algorithms include RSA of H(m) and DSS.

Returning to the exemplary chain-of-trust verification process at step 114, the GD and TA modules may reside, for example, at an operating system level ("ring 0") on system software. The TA software may authenticate the GD, such as by generating a one-way cryptographic hash of its code segments and comparing it to an approved list of hash values, by challenge response of shared secrets, or other appropriate cryptographic method. For example, if the hash value is not found, then the authentication fails at step 114 and the SVG hardware may refuse to render and display the content at step 116. If the hash value is found, then the GD is authenticated and the TA software validates the message $E_{TE'}$(N,PID,CID), $S_{SS''}$($E_{TE'}$(N,PID,CID)), using the signing key of the SVG hardware (SS"). The TA software then may decrypt the PID and CID using the TA public key (TE").

The TA software then authenticates the player/receiver device by generating a one-way cryptographic hash of its code segments in memory and comparing it to a list of approved hash values. Software for the player/receiver should generally reside at an application level, e.g., "ring 3" of the system. If the hash is not found then authentication again fails at step 114 and the SVG hardware will refuse to render and display the content at step 116. Note that as new components such as a player/receiver device or a graphics driver are activated or old components are compromised and revoked, the TA software or its database containing the list of approved hash values can be updated to enable or prevent authentication. This update can be performed manually by the user or automatically by the TA software through the Internet or another supported backchannel.

If the hash is found, then TA authenticates the player/receiver device at step 114 and sends the PID and CID to the player/receiver device so that it can authenticate any upstream devices, such as the digital rights management system or conditional access system supplying the SVC. The player/receiver device then authenticates any upstream devices, determines that rendering of the SVC is authorized and returns its portion of the secret key (K2) to the TA software. The TA uses the public key of the SVG hardware (SE") to encrypt and send the K2, the original PID and N+1 to the SVG hardware in the following message:

$$E_{SE''}(N+1,PID,K2).$$

The SVG hardware decrypts the message using its SE" and compares the values for PID and N with the originals to determine whether use of the content is authorized. If they match then the SVG authorizes use of the SVC. As noted before, under certain conditions step 108 (decryption) may be deferred for at least a portion of encrypted SVC until after the chain-of-trust for the content has been verified at step 114. At step 108, the SVG hardware may use the secret key H(K1, K2) to decrypt the content.

Before providing A/V output at step 112, the SVG hardware may perform optional step 118, embedding forensic tracking data in the decrypted SVC data. The forensic tracking data may be useful in tracking the content back to its source should it ever be used in an unauthorized way downstream of this particular decryption and rendering. The forensic tracking data could include for example a unique content identifier, a user or subscriber name, content purchase transaction identifier, hardware serial numbers, MAC addresses, system time and IP address. Such data would be obtained from the GD software or the TA software and would be embedded in the SVC data as a watermark by the SVG hardware.

At step 112, the SVG hardware provides the decrypted video content, with or without the embedded forensic data, directly to the display through a secure video output link. The secure video output link may use link encryption content protection technologies, for example 5C Digital Transmission Content Protection (DTCP) or High-bandwidth Digital Content Protection (HDCP), to restrict display to approved encrypted outputs. Analog video and audio output may also be provided.

While method 100 exemplifies useful steps and processes for processing A/V content, the invention is not limited to the particular steps and processes described above. One of ordinary skill may devise, for example, other useful ways for authenticating sources of secured content, without departing from the scope or spirit of the invention.

Figure 2:
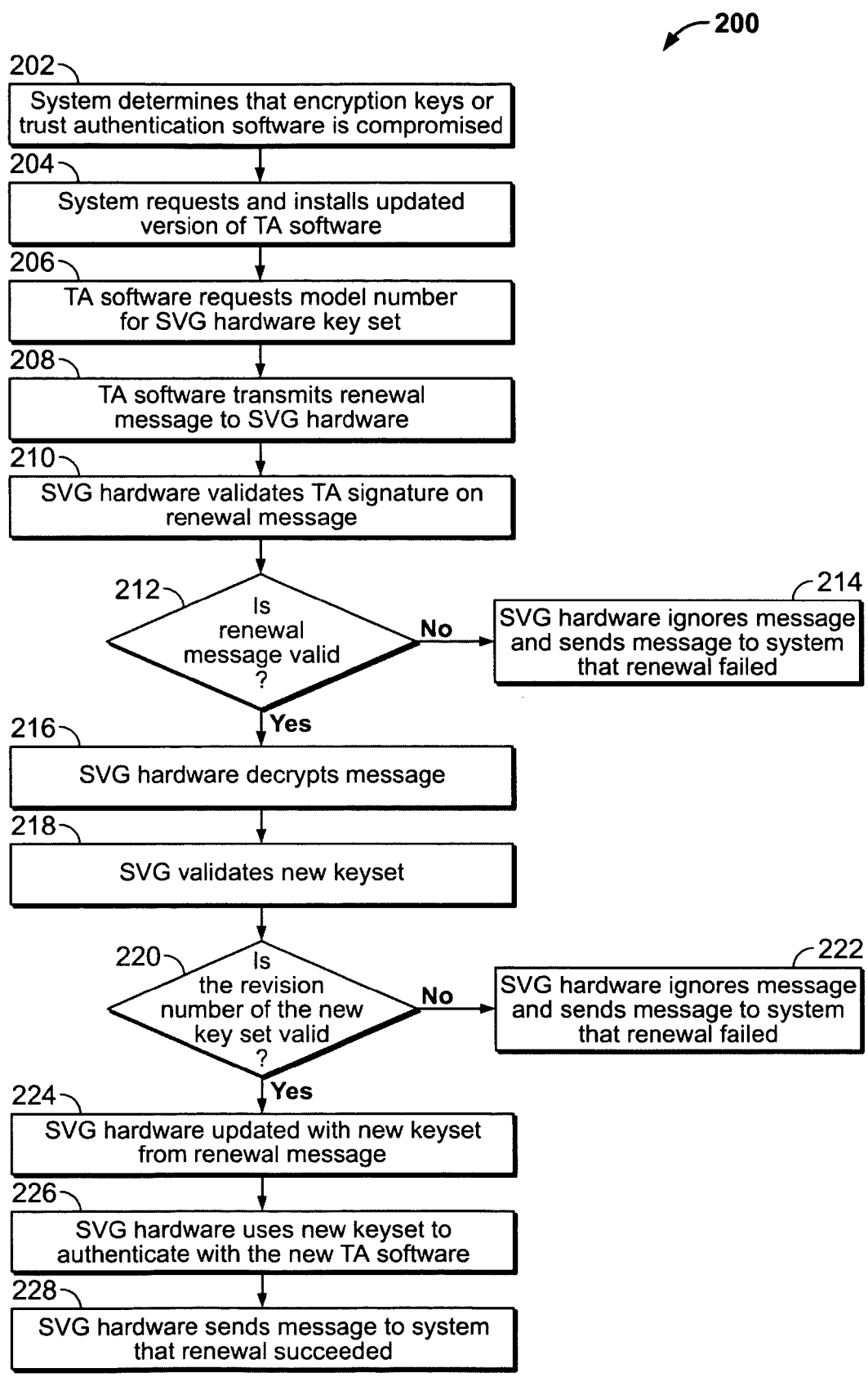
FIG. 2 is a flow chart illustrating exemplary steps for a method of renewing the authentication software and or the cryptographic keyset of the secure video system if it has been compromised.

FIG. 2 shows a method 200 for repairing system security if the encryption keys become compromised or if an implementation of the TA software is hacked. The TA software for this system may be protected, using various tamper resistant techniques, for example, code obfuscation, encrypted code segments, self-modifying code, embedded split keys, anti-debugging and cryptographic code integrity. In the event that either the TA software itself or any of the keys within the TA or SVG hardware are compromised, method 200 may be used to restore system security by installing an updated version of the TA software on the SVG hardware.

At step 202, the system discovers that either the current encryption keys for the SVG hardware and/or TA have been compromised or that the TA software itself has been hacked. This may occur, for example, when a revocation message sent from a public server, an upstream media device, or another supported back channel is received, or from user input. At step 203, the SVG system may request and install an updated version of TA software from a public server, an upstream media device or other supported back channel, or manually installed by the user. The updated version of TA software includes a new keyset, for example {new SS', new SE', new TE}, which the TA securely uploads to the SVG hardware according to the following steps.

At step 206, the TA software requests the model number for the SVG hardware keyset. Each SVG system may use a special keyset dedicated for revocation and system renewal, designated herein as SRE" and SRS". This set of keys may be unique for each brand and or model of SVG hardware, allowing renewal to be performed on a per model basis. In addition, the SVG hardware may record a revision number (rev) of its current keyset: {SS", SE", TE", K2}. After receiving an SVG model number ("model") from the SVG hardware, the updated TA software may determine which pre-encrypted system renewal message to provide to the SVG hardware based on the model and revision numbers. The TA software may generate multiple pre-encrypted renewal messages, one for each model number of SVG hardware to be renewed as follows:

$E_{SRE[model]}$(N,RENEW,model,rev,newSS",newSE", newTE",newK2), $S_{SR\{n\}'}(E_{sre[model]}$(N,RENEW,model,rev,newSS", newSE",newTE",newK2), wherein "RENEW" represents any value interpreted as a renewal command and the remaining variables are as previously described.

At step 208, the updated TA software sends the appropriate renewal message for the SVG hardware model. At step 210, the SVG hardware validates the signature of the renewal message using its SRS" key. If the message is invalid at step 212 then the SVG hardware ignores the renewal message and sends a message to the TA software that the renewal attempt failed at step 214.

If the SVG hardware determines that the renewal message is valid at step 212 then the SVG hardware decrypts the message using its SRE" key at step 216. At step 218, the SVG hardware validates the message by comparing the value "n" against the model number and the value "rev" against the revision number of the current keyset. If either the model number does not match or the revision number is less than the current revision, then the renewal message is not valid. If the renewal message is not valid, at step 220 the SVG hardware ignores the renewal message and sends a message to the TA software that the renewal attempt failed at step 222.

If the message is validated at step 220, then at step 224 the SVG hardware is updated with the new keyset in the renewal message {newSS", newSE", newTE", newK2} and the revision level is updated. At step 226, the SVG hardware uses the new keyset to authenticate with the new TA software. Once the SVG hardware has successfully authenticated with the TA software, the SVG hardware sends a message to the system that the renewal was successful at step 228.

In an alternative embodiment of the SVG system, the current keyset {SS", SE", TE", K2} may be stored in volatile memory on the SVG hardware and is lost every time the power is removed. In this embodiment, the keyset should be restored at start up using the above described renewal process. The latest revision number, at least, should be stored in a non-volatile memory of the SVG hardware, to ensure that the proper revision of the keyset for that model is restored.

In another embodiment, the SVG hardware may support simultaneous keysets for increased backwards compatibility. Renewal messages may be used to add a new keyset, without voiding the prior keyset. Prior keysets need not be voided by the renewal message, unless a voiding instruction is provided in the renewal message, or a properly authenticated revocation message is received.

While method 200 exemplifies useful steps and processes for renewal of a keyset, the invention is not limited to the particular steps and processes described above. One of ordinary skill may devise other ways for renewing a keyset without departing from the scope or spirit of the invention. In addition, keyset renewal should enhance the security and utility of a system according to the invention, but may not be a necessary feature in all embodiments of the invention.

Figure 3:
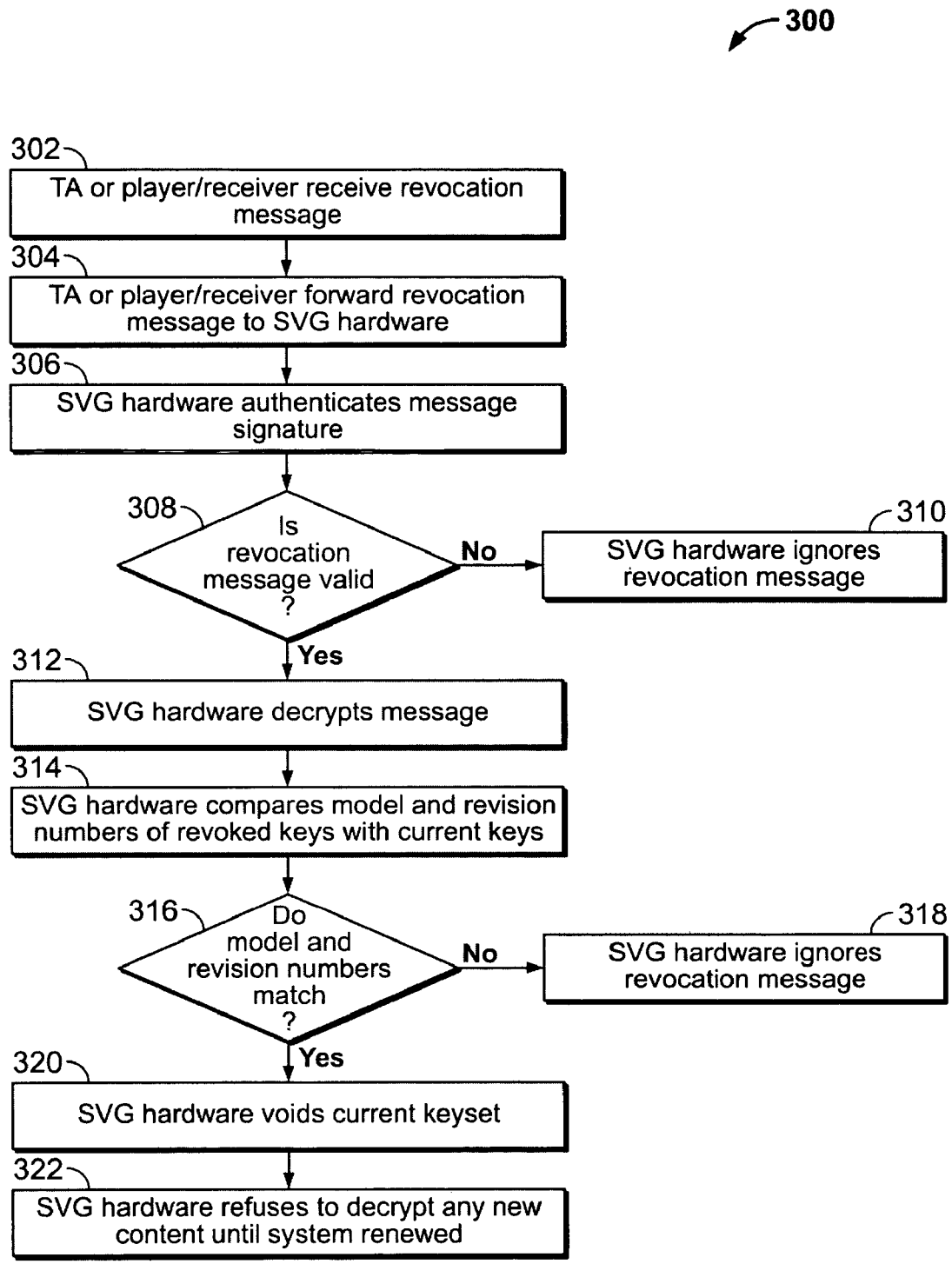
FIG. 3 is a flow chart illustrating exemplary steps for a method of revoking the cryptographic keyset of the secure video system.

FIG. 3 shows a method 300 for revoking a keyset based on a revocation message received from a public server, upstream media or device, another supported backchannel or based on a revocation watermark contained in any graphic image or video sequence decrypted and displayed by the SVG hardware. Method 300 may be useful, for example, to revoke a compromised keyset and thereby prevent unauthorized use of encrypted content. At an initial step 302, TA software or a player/receiver device may receive a revocation message from a public server, upstream media or device, or another supported backchannel. A revocation message, for example, may comprise information in the form of:

$E_{SRE[model]}$(N,REVOKE,model,rev) $S_{SR[n]}$(N,REVOKE,model,rev), wherein "REVOKE" represents any value interpreted as a revocation command and the remaining variables are as previously described.

At step 304, the TA or player/receiver device may forward the revocation message to the SVG hardware for processing. At step 306, the SVG hardware authenticates the signature of the message using its $S_{SR[n]''}$ key. If the signature is not valid at step 308, then the SVG hardware may ignore the revocation message at step 310.

If the message signature is valid at step 308, then the SVG hardware may decrypt the message using its $E_{SRE[model]}$ key at step 312. At step 314, the SVG hardware compares the values of the model number and revision ("rev") number on the decrypted message to its model number and the current rev number of its keyset. At step 316, if the model number does not match or if the revision number is less than the revision number of its current keyset at step 316 then, at step 318, the SVG hardware ignores the revocation message and continues to maintain its current keyset as a valid keyset.

At step 316, if the model and revision numbers match the SVG model and the current keyset, then the message is verified and the current keyset may be voided at step 320. At step 322, the SVG hardware may refuse to decrypt any SVC content until it receives a new, valid keyset, such as by using method 200 for system renewal. In an alternative embodiment, the SVG hardware may maintain multiple simultaneous keysets for backward compatibility, it should be possible to revoke less than all valid keysets. In this case, the SVG hardware should still be able to decrypt and display content encrypted with the remaining valid keysets.

In the alternative, a revocation process may be initiated by a revocation message embedded into a still graphic image or a video sequence, such as by using a revocation watermark. Various watermarking methods are known in the art for digital content, and any suitable method may be used to embed a revocation message. A revocation process using a watermark may operate in essentially the same way as method 300 with respect to all steps, except for steps 302 and 304. Instead of the TA or player/receiver device receiving the revocation message and forwarding it to the SVG hardware, the SVG hardware detects the revocation message embedded in a revocation watermark on the SVC when it analyzes digital content received. Once the SVG hardware detects a revocation message in the decrypted content, it may authenticate and verify the message according to the process in steps 306-316.

If the message is authenticated, the SVG may revoke the affected keys, and thereby not decrypt any further content using those keys until the system is renewed. In this embodiment, it should possible to embed the revocation message into various types of content, including, for example, HTML and XML objects, graphic image files of various formats, SVC or regular multi-media content, audio files of various formats and other information objects. Using other types of objects, it should be possible to revoke keysets and prevent unauthorized access in advance of providing controlled content to a receiving device.

Using a watermark, it should also be possible to communication directly with SVG hardware and revoke a version of TA software. This may be useful, for example, to replace a TA software module that has become corrupted or outdated. Using a secure watermark, SVG hardware may be instructed to stop using a particular TA module until it can be renewed. To prevent TA from being compromised in the first place, it should be useful to make it tamper resistant using one or more techniques as known in the art, for example, code obfuscation, encrypted code segments, self-modifying code, embedded split keys, anti-debugging, and cryptographic code integrity.

While method 300 exemplifies useful steps and processes for revocation of a keyset, the invention is not limited to the particular steps and processes described above. One of ordinary skill may devise other ways for revoking a keyset or trust authority module, without departing from the scope or spirit of the invention. In addition, revocation should enhance the security and utility of a system according to the invention, but may not be necessary in all embodiments of the invention.

Figure 4:
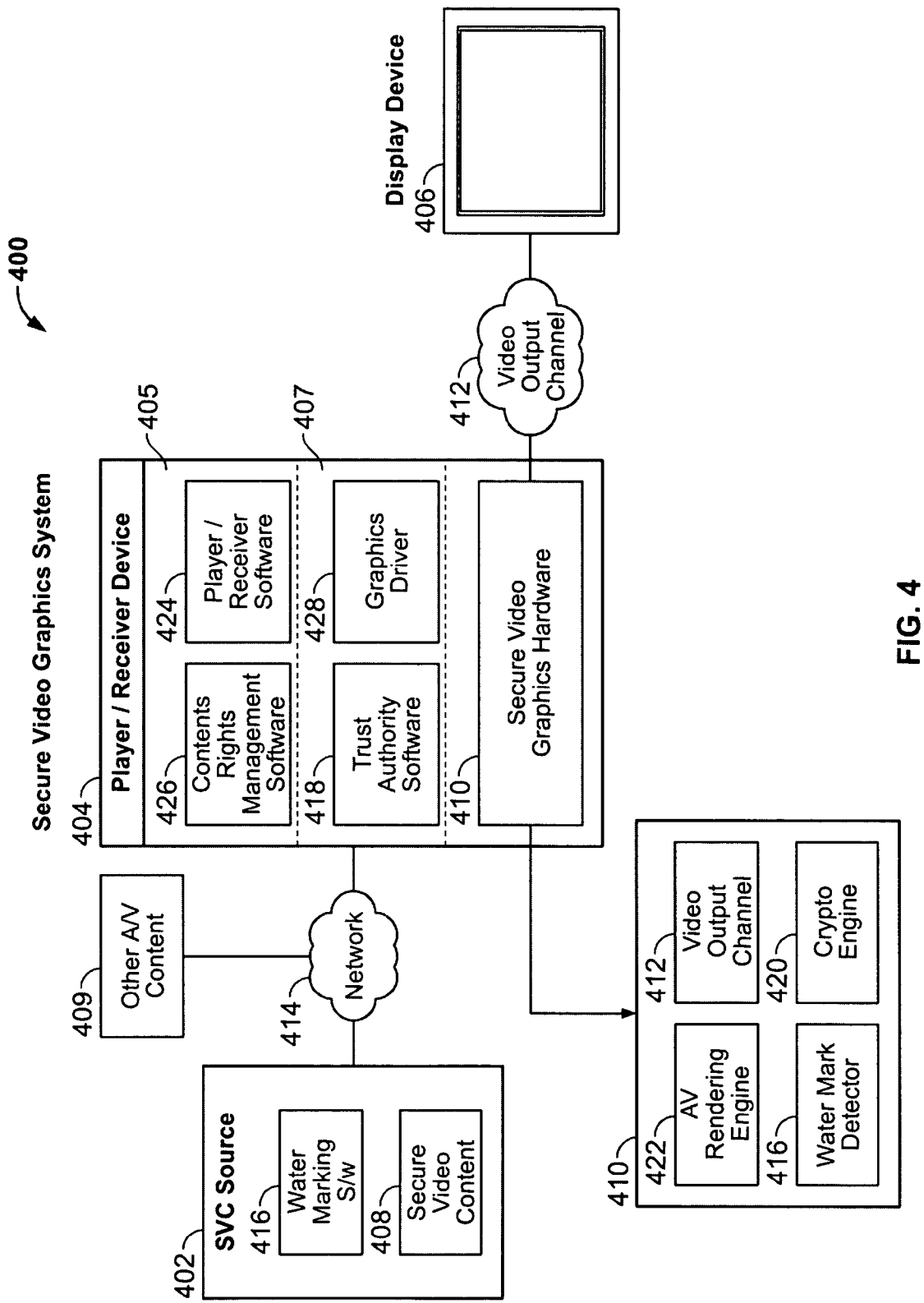
FIG. 4 is a block diagram showing an exemplary system according to the invention.

FIG. 4 is a block diagram showing an embodiment of an exemplary system 400 configured to provide secure video content 408 to a passive display device (i.e., one without its own graphics adaptor). System 400 generally comprises an SVC data source 402 having a communication link, such as via a public network 414, to a player/receiver device 404. Other audio-visual content 409 is also accessible to the player/receiver via the network 414 or other pathway. The presence of a network connection is not required, however. SVC content 408 and other content 408 may be supplied in other formats, such as on media discs, digital broadcasts, or digital tapes. Player/receiver device 404 may be configured to provide a suitable video signal to a display device 406.

SVC 408 remains in encrypted form until it is rendered in the SVG hardware 410. Once rendered, the video output signal may be routed through internal circuitry to display device 406, if the display device and player device are integrated in a single device. For example, a personal computer may comprise an integrated media player. Otherwise, if the display device is not integrated with the player/receiver device and SVG hardware, such as a system where a DVD player or set-top box is connected to a TV, the video signal may sent through a suitable video output 412 to passive display device 406.

During operation of system 400, the SVC source 402 may provide secure video content 408 to a player/receiver device 404 through a network 414. Source 402 may comprise a digital rights management system or a secure conditional access system, as implemented, for example, in a satellite media-delivery system, cable system, encrypted digital broadcast, or using pre-recorded secure content such as an encrypted DVD. It should be apparent that a user may also provide non-SVC content 409 to player receiver 404. Authorized content, both SVC and non-SVC, should be rendered and displayed by system 400.

Player/receiver 404 device may comprise any one of a variety of different systems, including but not limited to consumer electronics devices such as a set-top box or a DVD player, a general purpose computer system with integrated or modular graphics in combination with software or firmware such as an embedded media player or software for playing DVDs. on a home computer, and professional gear for audiovisual content playback, recording and/or editing. In the system as depicted, the display device 406 is depicted as a standalone passive device for audiovisual playback connected to the receiving/player device 404, such as a TV connected to a set-top box. However, in an alternative embodiment, the display device 406 may be integrated with the player/receiver device 404, such as a personal computer, with an embedded media player or DVD software or a professional editing system. In either embodiment, the video signal for display output may be sent to the display module from the secure video graphics hardware 410 through a video output channel 412.

The secure video content 408 should be encrypted. In addition, the SVC should include a robust watermark or other secure indicator designating it as SVC. For example, the secure delivery system may use any suitable watermarking system 416 as known in the art to embed a SVC watermark on all SVC before it is encrypted and sent to the player/receiver device 404. Once the player/receiver device 404 receives the content, it passes the encrypted SVC 408 to the SVG hardware 410.

The SVG hardware may then determine whether the SVC 408 is properly encrypted. If the content is not encrypted, the SVG hardware may use a watermark detector 416, or other suitable method of detecting a SVC indicator, to determine whether the content is marked as comprising SVC. Content that contains the SVC indicator should not be rendered and displayed if it is received in an unencrypted form.

If SVC content is determined to be properly encrypted, the SVC hardware 410 may initiate communication with a trust authority (TA) system 418 in a kernel 407 of the player/receiver device 404. A cryptographic engine 420 in the SVG hardware and TA software 418 may initiate a series of cryptographic handshakes and key exchanges with or through the graphics driver 428, to verify that the SVC 408 originates from an approved and properly authenticated source. For example, the SVG hardware 410 and trust authority 418 may communicate with player/receiver software 424 in an application layer 405 of the player receiver, to verify that a DVD disc or other source is authentic. The cryptographic engine 420 hardware should be tamper resistant to protect the keyset and renewal/revocation keys from being compromised. For example, the printed circuit board (PCB) components and wire etchings may be coated with an epoxy to deter physical tampering.

Once the SVG hardware 410 and TA software 418 have securely authenticated the player software 424 for the player/receiver device 404, the player software 424 authenticates any upstream software components and devices, such as the secure delivery system 402 and communicates with the content rights management software 426 to determine if playback of the SVC 408 is authorized under the content provider's business rules. Further details of a suitable authentication method 100 have been described above in connection with FIG. 1.

Once the SVC 408 has been authenticated, the SVG hardware 410 decrypts and renders the SVC 408 as authorized by the player software 424. As the SVG hardware 410 is rendering the content, the watermark detector 416 detects and extracts any protection related data which has been embedded into the SVC 408. For example, if a revocation message has been embedded into the content, the SVG hardware 410 may stop rendering the content and authenticate the revocation message as described in method 300. If the revocation message is valid then the keyset may be revoked and the SVG hardware 410 will discontinue rendering the SVC 408 until the system is renewed. In one embodiment, the watermark software 416 also has the capability to embed forensic tracking data from for this particular system in the decrypted video signal. Such information may include username, hardware serial numbers, MAC addresses, IP addresses and/or system time.

The decrypted SVC 408 is then displayed on the display device 406. The decrypted video output signal may be transmitted to the display through a video output channel 412. The video output 412 may use link encryption technology such as 5C Digital Transmission Content Protection (DTCP) or High-bandwidth Digital Content Protection (HDCP) to restrict display to approved, encrypted and protected outputs, as known in the art. A unsecured video output channel may also be used.

Figure 5:
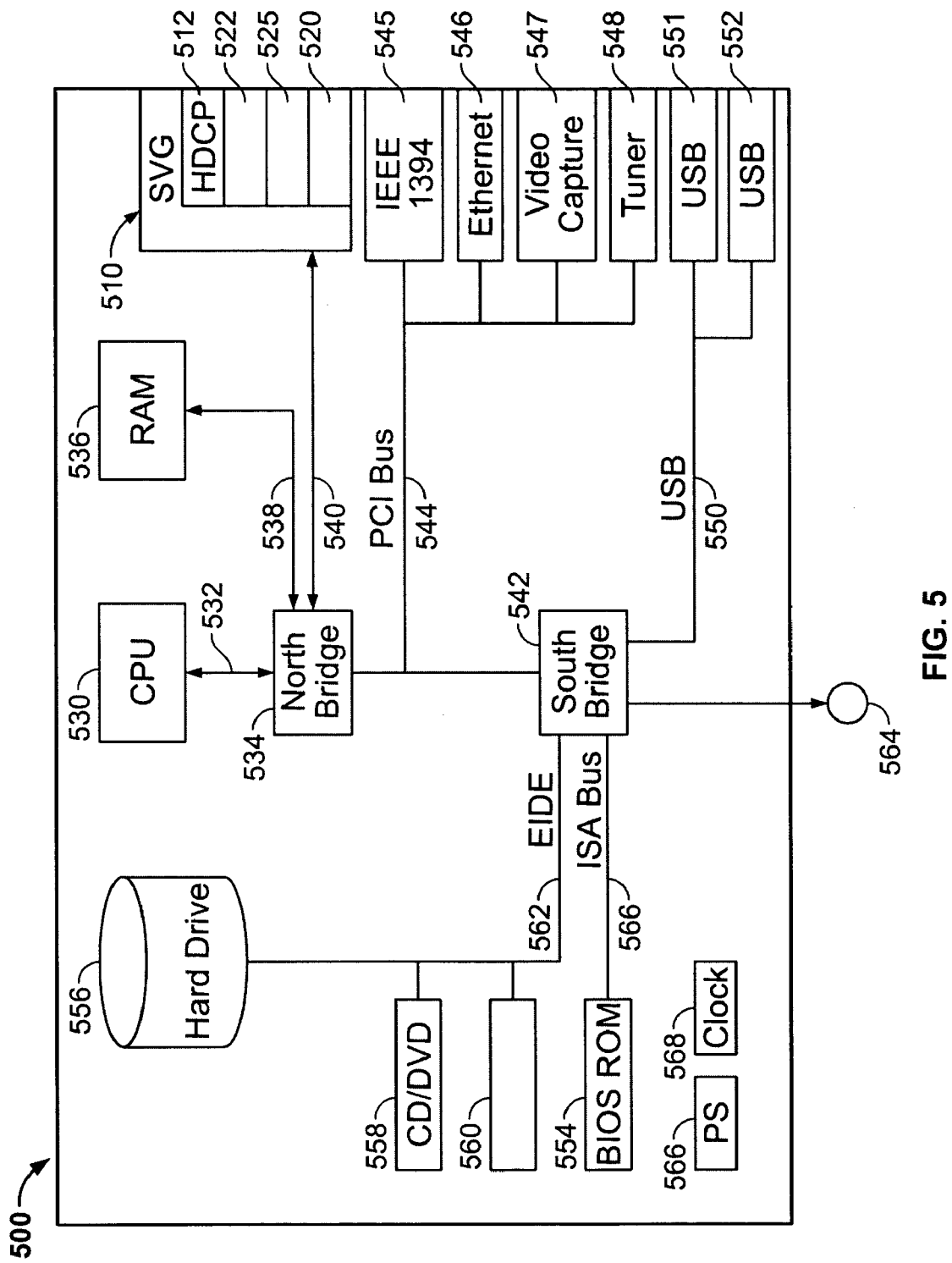
FIG. 5 is a block diagram showing an exemplary computer system incorporating secure video graphics hardware.

An SVG system may be implemented in a general-purpose computer system. FIG. 5 is a block diagram showing one such computer system 500 equipped with SVG hardware 510. System 500 may comprise a CPU 530 connected via a system bus 532 to a first system controller 534, sometimes known as a north bridge chip. First controller 534 may control operation of a memory bus 538 for random access memory 536 holding program instructions for execution by the CPU, and a dedicated graphics bus 540. First controller 534 may also be connected to a second controller 542, sometimes known as a south bridge chip. The south bridge 542 controls various I/O buses, such as a PCI bus 544, universal serial bus 550, and ISA bus 566 connected to a basic input/output system (BIOS) memory 554, and an EIDE interface 562 for a hard drive 556, CD/DVD player 558, or other EIDE drives and devices 560. The south bridge may also control the interface with various I/O devices such as keyboards, pointing devices, and printers, generally represented at 564.

Various ports and devices for inputting and outputting digital content may be connected to PCI bus 544. For example, a "Firewire" port 545, Ethernet port 546, a video capture/MPEG encoder device 547, a broadcast signal tuner/receiver 548, and so forth. Several USB ports 551, 552 may also be connected via south bridge 542.

The arrangement of CPU 530, north bridge 534, south bridge 542, and the various system buses, interfaces, storage and memory devices, and I/O ports as shown in FIG. 5 should be generally familiar to one of ordinary skill in the art of computer system design. System 500 may include other conventional components such as a power supply and clock 568; such details should also be readily apparent to one of ordinary skill.

In general, conventional systems may permit numerous digital content streams to be available over buses connected to the south bridge. To the extent that these streams are not encrypted, such content may be diverted to an unauthorized destination or use. For example, a DVD player 558 may play an optical media disc containing encrypted content. The player decrypts or decodes the content and output from the player is communicated over EIDE 562. The content is authorized for delivery to a video adaptor for a display device, but may also be delivered to other devices connected via the south bridge, for example, to an Ethernet port 546 for unauthorized redistribution or another EIDE drive for unauthorized copying. By way of further example, content may also be provided via tuner 548 or video capture card 547 for similar authorized or unauthorized uses.

It is desirable, therefore, to encrypt and protect content communicated over busses internal to system 500, as described elsewhere in the specification. To make use of such protected content, SVG hardware is provided. SVG hardware 510 may be implemented, for example, as a peripheral device integrated with system CPU 530 on a circuit board. As apparent from FIG. 5, in the illustrated embodiment the SVG hardware 510 is not configured as a video adapter for connecting to PCI bus 544, universal serial bus 550, or other south bridge bus, although such an arrangement may also be possible. Instead, the SVG hardware is connected to north bridge 534 via a graphics bus 540. The SVG hardware may comprise components as previously described, for example, a secure HDVP/DVI output 512, an AVI renderer and watermark detector 522, and a cryptographic engine 520. Hardware 510 may further comprise one or more additional networks outputs 525, for communication with other elements of a secure system such as with a trust authority for verifying chain-of-trust, or for authorized redistribution of encrypted and protected SVG output. Operation and configuration of system 500 as a player/receiver device including SVG hardware may be accomplished as described above in connection with FIGS. 1-4.

Having thus described a preferred embodiment of a secure video adaptor system, it should be apparent to those skilled in the art that certain advantages of the within system have been achieved. It should also be appreciated that various modifications, adaptations, and alternative embodiments thereof may be made within the scope and spirit of the present invention. For example, a system wherein the secure video graphics hardware is located on the graphics adaptor of a playback device has been illustrated, but it should be apparent that the inventive concepts described above would be equally applicable to standalone devices or to graphics adaptors that attach to or plug into third party devices used in combination with software or firmware designed for audiovisual content playback and/or recording. The invention is further defined by the following claims.

What is claimed is:

1. A secure graphics video system, comprising:
video graphics hardware configured to receive encrypted digital audio-video data, the digital audio-video data comprising content designated as secure video content and content that is not designated as secure video content, the video graphics hardware operable to process the digital audio-video data to provide a video signal for a display device;

a detection module integrated with the video graphics hardware, the detection module operable to distinguish the secure video content from the content that is not designated as secure video content;

a trust authentication module integrated with the video graphics hardware, the trust authentication module adapted to authenticate a source of the secure video content, wherein the video graphics hardware is configured to not render the secure video content as a video signal for the display device, unless the secure video content is authenticated by the trust authentication module, and to render content that is not designated as secure video content as a video signal without authentication of its source; and a watermark detector operatively associated with the video graphics hardware, the watermark detector adapted to detect a watermark embedded in the video signal, the watermark indicating that the content is secure video content;

wherein the video graphics hardware is configured to stop rendering the content in response to detection of the watermark, unless the content is secure video content that has been authenticated by the trust authentication module.

2. The system of claim 1, wherein the video graphics hardware is adapted to generate the video signal in an encrypted format.

3. The system of claim 2, wherein the video graphics hardware is adapted to generate the video signal in an encrypted format using a link encryption method.

4. The system of claim 1, further comprising a cryptographic module integrated with the video graphics hardware, the cryptographic module configured to decrypt the digital audio-video data for the video graphics hardware.

5. The system of claim 4, wherein the video graphics hardware is configured to not render the secure video content as a video signal, unless the digital audio-video data is received in encrypted form.

6. The system of claim 4, wherein the video graphics hardware is further configured to revoke operability of the cryptographic module by receiving content comprising a specially configured watermark.

7. The system of claim 4, wherein the video graphics hardware is operatively associated with a non-volatile memory, the memory holding a revision identifier for a cryptographic keyset used by the cryptographic module to decrypt the secure video content.

8. The system of claim 7, wherein the memory further holds a model identifier for the video graphics hardware.

9. The system of claim 4, further comprising a media player connected to provide the digital audio-video data in encrypted form to the video graphics hardware, the media player configured to communicate with the trust authentication module.

10. A method for preventing unauthorized use of a secure video content to provide a video output signal, the method comprising:

receiving encrypted digital audio-video data;

determining whether the audio-video data comprises a secure video content indicator;

authenticating a source for the audio-video data if the audio-video data comprises a secure video content indicator;

providing an output signal from the audio-video data only if (a) the audio-video data does not comprise a secure video content indicator, or (b) the audio-video data does comprise a secure video content indicator and the source is authenticated in the authenticating step;

monitoring the output signal to detect a watermark embedded in the output signal, the watermark indicating that the audio-video data is secure video content; and in response to detecting the watermark, stopping any rendering of the secure video content unless the source is authenticated.

11. The method of claim 10, wherein the authenticating step further comprises communicating with a trust authority to authenticate the source.

12. The method of claim 10, wherein the determining step further comprises decoding a secure video content watermark in the audio-video data.

13. The method of claim 10, further comprising decrypting the audio-video data only if its source is authenticated in the authenticating step.

14. The method of claim 13, further comprising renewing a cryptographic keyset used to perform the decrypting step.

15. The method of claim 14, wherein the renewing step further comprises securely uploading a new cryptographic keyset to a secure video graphics system.

16. The method of claim 13, further comprising revoking a cryptographic keyset used to perform the decrypting step.

17. The method of claim 16, wherein the revoking step further comprises receiving a secure message from an upstream source.

18. The method of claim 10, further comprising encrypting the output signal.

19. The method of claim 10, further comprising inserting forensic tracking information as a tracking watermark into the output signal.

20. The method of claim 10, further comprising providing the output signal as an audio output signal.

21. The method of claim 10, further comprising providing the output signal as a video output signal.

* * * * *